(12) United States Patent
Suba (10) Patent No.: US 8,717,502 B2
(45) Date of Patent: May 6, 2014

(54) METHODS AND APPARATUSES FOR UPSCALING VIDEO

(75) Inventor: Victor Suba, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 1146 days.

(21) Appl. No.: 11/725,901

(22) Filed: Mar. 19, 2007

(65) Prior Publication Data

US 2008/0231755 A1 Sep. 25, 2008

(51) Int. Cl.

| H04N 5/14 | (2006.01) |
|---|---|
| H04N 9/64 | (2006.01) |
| H04N 7/01 | (2006.01) |
| H04N 11/20 | (2006.01) |
| H04N 11/04 | (2006.01) |
| H04N 7/12 | (2006.01) |
| H04N 11/02 | (2006.01) |
| H04N 5/21 | (2006.01) |

(52) U.S. Cl.
USPC ........ 348/699; 348/448; 348/452; 348/390.1; 348/625

(58) Field of Classification Search
USPC .......................................................... 348/699
See application file for complete search history.

(56) References Cited

U.S. PATENT DOCUMENTS

| 5,532,751 A * | 7/1996 | Lui ................................ 348/452 |
| 6,295,089 B1 * | 9/2001 | Hoang ........................ 348/390.1 |
| 6,529,613 B1 | 3/2003 | Astle |
| 6,600,517 B1 * | 7/2003 | He et al. ......................... 348/625 |
| 6,630,961 B1 | 10/2003 | Shin et al. |
| 6,680,752 B1 * | 1/2004 | Callway et al. ................ 348/448 |
| 7,023,487 B1 * | 4/2006 | Adams ........................... 348/448 |
| 7,075,581 B1 * | 7/2006 | Ozgen et al. ................... 348/448 |
| 7,893,993 B2 * | 2/2011 | Winger et al. .................. 348/448 |
| 2001/0008425 A1 | 7/2001 | Shin et al. |
| 2004/0135926 A1 | 7/2004 | Song et al. |
| 2004/0207753 A1 | 10/2004 | Jung |
| 2004/0257475 A1 | 12/2004 | Kim et al. |
| 2005/0073607 A1 | 4/2005 | Ji et al. |
| 2005/0134730 A1 | 6/2005 | Winger et al. |
| 2005/0141785 A1 | 6/2005 | Chao |
| 2005/0162548 A1 | 7/2005 | Kang et al. |
| 2005/0168633 A1 | 8/2005 | Neuman et al. |

(Continued)

FOREIGN PATENT DOCUMENTS

| JP | 4-364685 | 12/1992 |
| JP | 11-069144 A | 3/1999 |

(Continued)

OTHER PUBLICATIONS

Brown, "Multi_scale Edge Detection and Feature Binding: An Integrated Approach", Pattern Recognition vol. 31, No. 10, pp. 1479-1490, 1998.*

(Continued)

*Primary Examiner* — Hee-Yong Kim (74) *Attorney, Agent, or Firm* — Fitch, Even, Tabin & Flannery, LLP (57) ABSTRACT

In one embodiment, the methods and apparatuses detect content that represents original image information; detect a direction of the content wherein the direction corresponds to a portion of the original image information; compare a variation between adjacent pixels that are represented by the original image information; and generate new image information based on the direction of the content and the variation between the adjacent pixels.

31 Claims, 8 Drawing Sheets

(56) References Cited

U.S. PATENT DOCUMENTS

| 2006/0039631 | A1 | 2/2006 | Chao |
| 2007/0040946 | A1 | 2/2007 | Nagakura et al. |
| 2007/0070244 | A1* | 3/2007 | Wyman et al. ............... 348/448 |

FOREIGN PATENT DOCUMENTS

| JP | 2000-253238 | | 9/2000 |
| JP | 2004-032708 | | 1/2004 |
| JP | 2004-193747 | | 7/2004 |
| JP | 2004-215163 | A | 7/2004 |
| JP | 2004-236012 | | 8/2004 |
| JP | 2006-054899 | A | 2/2006 |

OTHER PUBLICATIONS

Patent Cooperation Treaty; "Notification of Transmittal of the International Search Report and the Written Opinion of the International Searching Authority or the Declaration" issued in corresponding PCT/US08/57264; mailed Aug. 6, 2008; 2 pages.

Patent Cooperation Treaty; "International Search Report" issued in corresponding PCT/US08/57264; mailed Aug. 6, 2008; 2 pages.

Patent Cooperation Treaty; "Written Opinion of the International Searching Authority" issued in corresponding PCT/US08/57264; mailed Aug. 6, 2008; 7 pages.

European Patent Office; "Communication Pursuant to Article 94(3) EPC" issued in European Application No. EP 08 73 2365.5 for PCT/US2008/057264; dated May 21, 2010; 1 page.

European Patent Office; "Extended European Search Report (including the Supplementary European Search Report and the European Search Opinion)" issued in European Application No. EP 08 73 2365.5 for PCT/US2008/057264; dated Feb. 25, 2010; 9 pages.

European Patent Office; "Extended European Search Report (including the Supplementary European Search Report and the European Search Opinion)" issued in European Application No. EP 09 01 4671.3 for PCT/US2008/057264; dated Feb. 19, 2010; 10 pages.

European Patent Office; "Summons to attend oral proceedings pursuant to Rule 115(1) EPC"; for corresponding EP Application no. 09014671.3; dated Nov. 2, 2011; (4 pages).

European Patent Office; "Communication Pursuant to Article 94(3) EPC" issued in corresponding European Application No. EP 08 732 365.5 for PCT/US2008/057264; dated Jan. 11, 2011; 5 pages.

European Patent Office; "Communication Pursuant to Article 94(3) EPC" issued in corresponding European Application No. EP 09 014 671.3 for PCT/US2008/057264; dated Jan. 11, 2011; 5 pages.

Japanese Patent Office; "Notification of Reasons for Refusal" issued in corresponding Japanese Patent Application No. 2009-554680, dated Jun. 26, 2012, 8 pages (includes English translation).

European Patent Office; "Decision to Refuse a European Patent Application", for corresponding European Patent Application No. 09014671.3, dated Jun. 14, 2012, 20 pages.

European Patent Office; "Communication under rule 71(3) EPC"; for corresponding EP Application No. 08 732 365.5-2202; dated Nov. 10, 2011; 38 pages.

Japanese Patent Office; "Final Notification of Reasons for Refusal" issued in corresponding Japanese Patent Application No. 2009-554680, dated Sep. 18, 2012, 4 pages (includes English translation).

Japanese Patent Office; "Decision to Grant a Patent" issued in corresponding Japanese Patent Application No. 2009-554680, dated Dec. 11, 2012, 3 pages.

* cited by examiner

METHODS AND APPARATUSES FOR UPSCALING VIDEO

FIELD OF THE INVENTION

The present invention relates generally to modifying video and, more particularly, to upscaling video.

BACKGROUND

There has been an increased demand in displaying content including images and video streams in higher quality formats. Often video streams are formatted as interlaced scans which allow the content to be broadcast on conventional CRT televisions with reduced bandwidth and flicker. However, interlaced content typically needs to be de-interlaced to be properly viewed on newer digital display devices. Unfortunately, the process of de-interlacing can introduce errors and artifacts to the de-interlaced content, because approximations are generated to replace missing data.

In addition, increasing the resolution of the content is useful to maximize the capabilities of improved display devices when viewing the improved or upscaled content. Unfortunately, similar to the de-interlaced content, the upscaled content can introduced errors and artifacts due to approximations that are utilized to replace missing data within the upscaled content. Further, to upscale the content often times the content needs to already be de-interlaced.

SUMMARY

In one embodiment, the methods and apparatuses detect content that represents original image information; detect a direction of the content wherein the direction corresponds to a portion of the original image information; compare a variation between adjacent pixels that are represented by the original image information; and generate new image information based on the direction of the content and the variation between the adjacent pixels.

BRIEF DESCRIPTION OF THE DRAWINGS

The accompanying drawings, which are incorporated in and constitute a part of this specification, illustrate and explain one embodiment of the methods and apparatuses for upscaling video. In the drawings.

DETAILED DESCRIPTION

The following detailed description of the methods and apparatuses for upscaling video refers to the accompanying drawings. The detailed description is not intended to limit the methods and apparatuses for upscaling video. Instead, the scope of the methods and apparatuses for upscaling video is defined by the appended claims and equivalents. Those skilled in the art will recognize that many other implementations are possible, consistent with the methods and apparatuses for upscaling video.

Although the title includes the terms "upscaling video", the scope of the invention includes solely de-interlacing the video content without upscaling any portion of the video content.

References to "electronic device" includes a device such as a personal digital video recorder, digital audio player, gaming console, a set top box, a computer, a cellular telephone, a personal digital assistant, a specialized computer such as an electronic interface with an automobile, and the like.

References to "content" includes images, video streams, and the like.

In one embodiment, the methods and apparatuses for upscaling video are configured to upscale and/or de-interlace image information. In one embodiment, related pixels are detected from a plurality of pixels. From these related pixels, a direction is determined. Further, local variation is detected between adjacent pixels for the plurality of pixels. In one embodiment, upscaling and/or de-interlacing image information is performed based on both the direction of the related pixels and the local variation among the plurality of pixels. In addition, the amount of image information is dynamically adjusted based on the direction of the related pixels in one embodiment.

In one embodiment, the methods and apparatuses for upscaling video are configured to detect image information and match the image information with previously stored templates.

Figure 1:
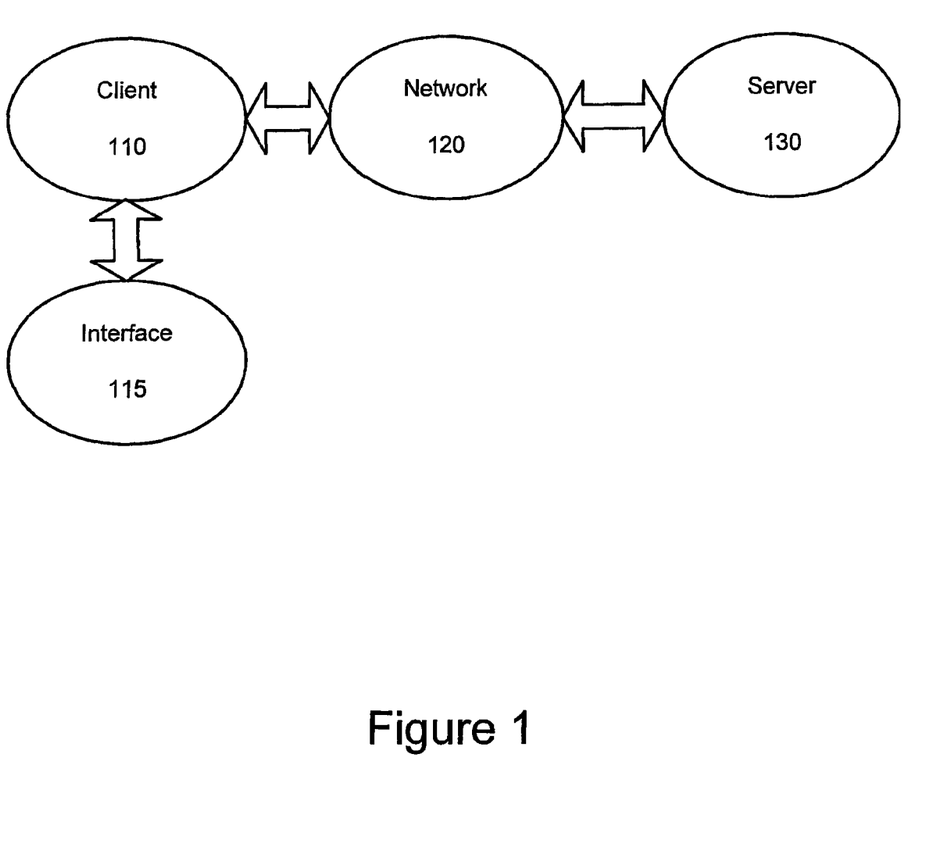
FIG. 1 is a diagram illustrating an environment within which the methods and apparatuses for upscaling video are implemented.

FIG. 1 is a diagram illustrating an environment within which the methods and apparatuses for upscaling video are implemented. The environment includes an electronic device 110 (e.g., a computing platform configured to act as a client device, such as a personal digital video recorder, digital audio player, computer, a personal digital assistant, a cellular telephone, a camera device, a set top box, a gaming console), a user interface 115, a network 120 (e.g., a local area network, a home network, the Internet), and a server 130 (e.g., a computing platform configured to act as a server). In one embodiment, the network 120 can be implemented via wireless or wired solutions.

In one embodiment, one or more user interface 115 components are made integral with the electronic device 110 (e.g., keypad and video display screen input and output interfaces in the same housing as personal digital assistant electronics (e.g., as in a Clie® manufactured by Sony Corporation). In other embodiments, one or more user interface 115 components (e.g., a keyboard, a pointing device such as a mouse and trackball, a microphone, a speaker, a display, a camera) are physically separate from, and are conventionally coupled to, electronic device 110. The user utilizes interface 115 to access and control content and applications stored in electronic device 110, server 130, or a remote storage device (not shown) coupled via network 120.

In accordance with the invention, embodiments of dynamically detecting and generating image information as described below are executed by an electronic processor in electronic device 110, in server 130, or by processors in electronic device 110 and in server 130 acting together. Server 130 is illustrated in FIG. 1 as being a single computing platform, but in other instances are two or more interconnected computing platforms that act as a server.

Figure 2:
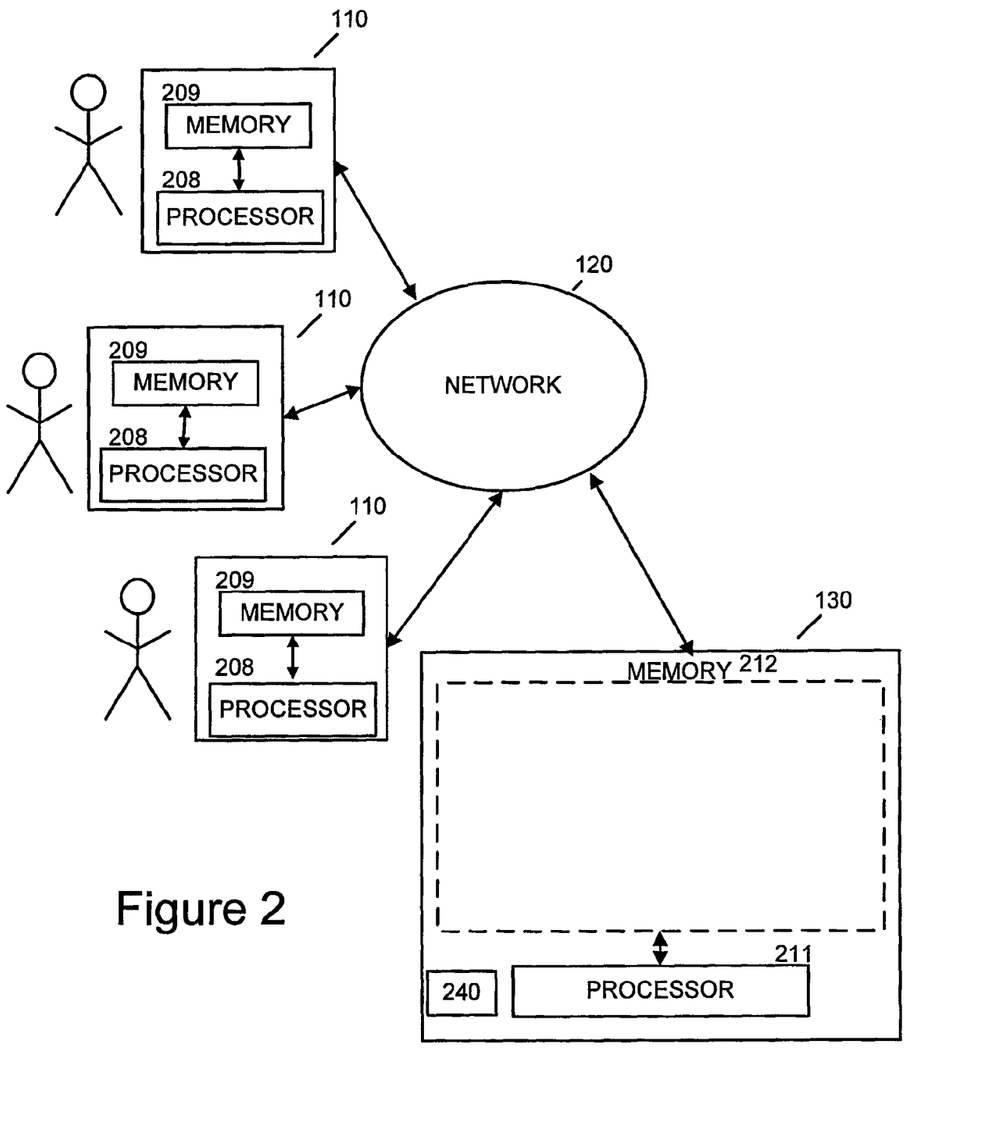
FIG. 2 is a simplified block diagram illustrating one embodiment in which the methods and apparatuses for upscaling video are implemented.

FIG. 2 is a simplified diagram illustrating an exemplary architecture in which the methods and apparatuses for upscaling video are implemented. The exemplary architecture includes a plurality of electronic devices 110, a server device 130, and a network 120 connecting electronic devices 110 to server 130 and each electronic device 110 to each other. The plurality of electronic devices 110 are each configured to include a computer-readable medium 209, such as random access memory, coupled to an electronic processor 208. Processor 208 executes program instructions stored in the computer-readable medium 209. A unique user operates each electronic device 110 via an interface 115 as described with reference to FIG. 1.

Server device 130 includes a processor 211 coupled to a computer-readable medium 212. In one embodiment, the server device 130 is coupled to one or more additional external or internal devices, such as, without limitation, a secondary data storage element, such as database 240.

In one instance, processors 208 and 211 are manufactured by Intel Corporation, of Santa Clara, Calif. In other instances, other microprocessors are used.

The plurality of client devices 110 and the server 130 include instructions for a customized application for upscaling video. In one embodiment, the plurality of computer-readable medium 209 and 212 contain, in part, the customized application. Additionally, the plurality of client devices 110 and the server 130 are configured to receive and transmit electronic messages for use with the customized application. Similarly, the network 120 is configured to transmit electronic messages for use with the customized application.

One or more user applications are stored in memories 209, in memory 211, or a single user application is stored in part in one memory 209 and in part in memory 211. In one instance, a stored user application, regardless of storage location, is made customizable based on dynamically detecting and generating image information as determined using embodiments described below.

Figure 3:
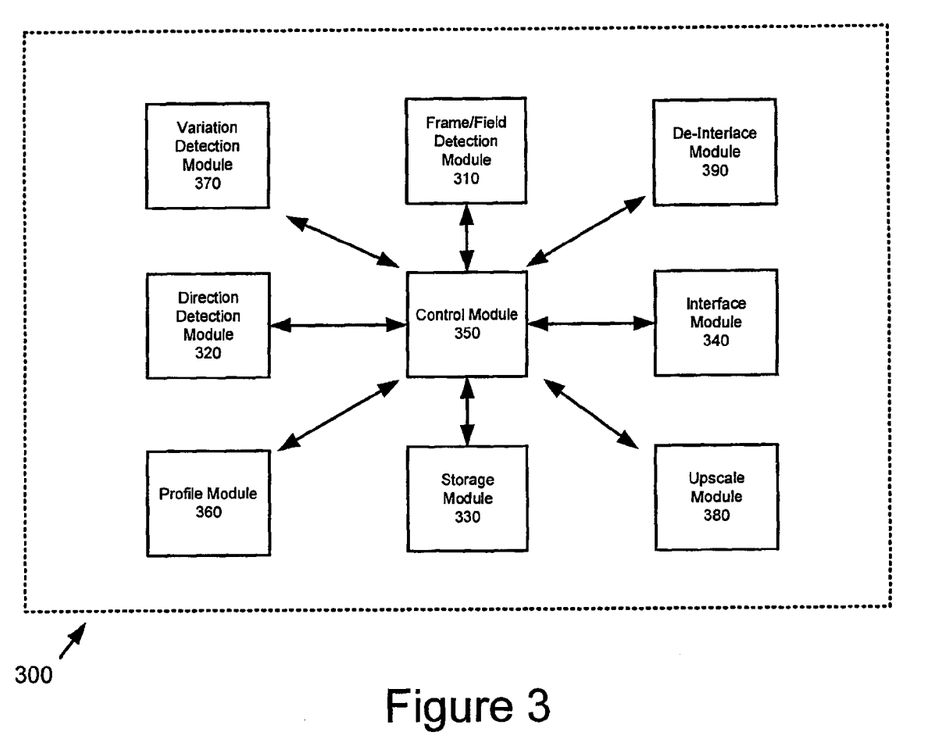
FIG. 3 is a simplified block diagram illustrating a system, consistent with one embodiment of the methods and apparatuses for upscaling video.

FIG. 3 illustrates one embodiment of a system 300 for upscaling video. The system 300 includes a frame/field detection module 310, a direction detection module 320, a storage module 330, an interface module 340, a control module 350, a profile module 360, a variation detection module 370, an upscale module 380, and a de-interlace module 390. In one embodiment, the control module 350 communicates with the frame/field detection module 310, the direction detection module 320, the storage module 330, the interface module 340, the profile module 360, the variation detection module 370, the upscale module 380, and the de-interlace module 390.

In one embodiment, the control module 350 coordinates tasks, requests, and communications between the frame/field detection module 310, the direction detection module 320, the storage module 330, the interface module 340, the profile module 360, the variation detection module 370, the upscale module 380, and the de-interlace module 390.

In one embodiment, the frame/field detection module 310 detects either a frame or field that forms the content. In one embodiment, the frame/field detection module 310 specifies a portion of the entire frame or field. For example, the frame/field detection module 310 may select an N×N pixel area (where N is an integer) within a frame or field.

In one embodiment, the direction detection module 320 detects movement of the pixels and detects the direction of this movement.

In one embodiment, the area in which pixels are detected is specified by the frame/field detection module 310. For example, the area specified by the frame/field detection module 310 may be the entire frame or field in one embodiment. In another embodiment, the area specified by the frame/field detection module 310 may be a portion of the entire frame or field.

In one embodiment, the direction detection module 320 is utilized to identify trends and identify related pixels that are not necessarily adjacent to each other. For example, the pixels that are detected by the direction detection module 320 may be identified based on a common vector associated with each of the related pixels. Further, the common vector may include various parameters such as color, illumination intensity, and the like.

The direction may be detected by calculating a local orientation at the point of interest in the source data. One method of calculating local orientation is by means of summing the 2D covariance matrices of image attributes in neighboring pixels. These attributes may include but are not limited to pixel color, illumination intensity, etc.

$$O(P) = \begin{pmatrix} \sum_{i=1}^{N}(C_x(i)C_x(i)) & \sum_{i=1}^{N}(C_x(i)C_y(i)) \\ \sum_{i=1}^{N}(C_x(i)C_y(i)) & \sum_{i=1}^{N}(C_y(i)C_y(i)) \end{pmatrix}$$

where O(P) is the local orientation at pixel P, N is the number of considered neighboring pixels to P in the source data, and C*(i) is the first derivative of the data attribute in the x and y axes corresponding to neighboring pixel i. The local image orientation is given by solving for the eigen vector corresponding to the smallest eigen value of matrix O(P).

Figure 4A:
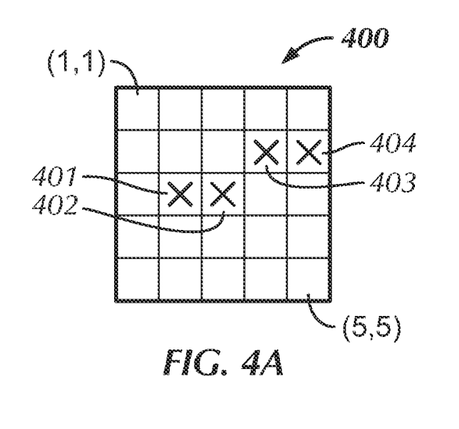
FIG. 4a represents an exemplary frame consistent with one embodiment of the methods and apparatuses for upscaling video are implemented.
Figure 4B:
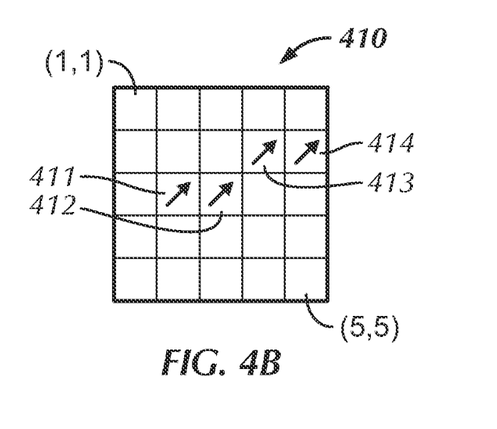
FIG. 4b represents an exemplary frame consistent with one embodiment of the methods and apparatuses for upscaling video are implemented.
Figure 4C:
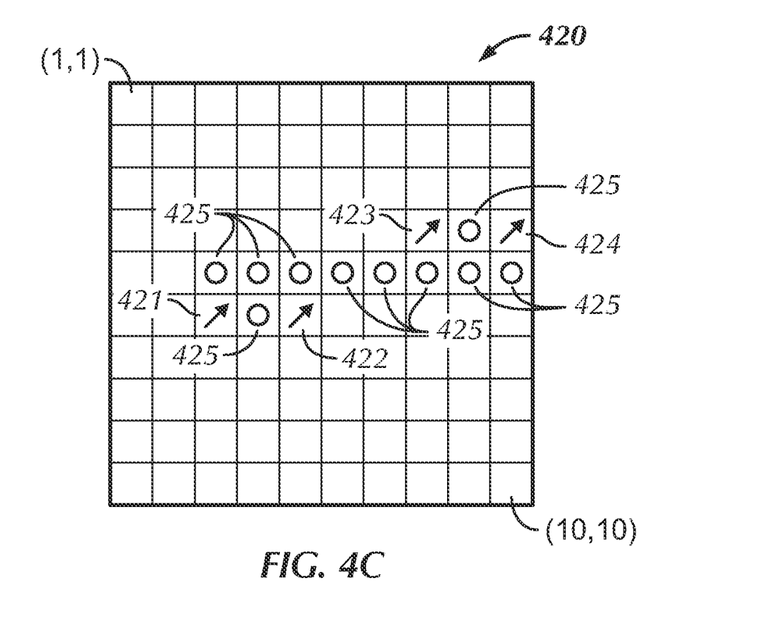
FIG. 4c represents an exemplary frame consistent with one embodiment of the methods and apparatuses for upscaling video are implemented.

Examples of the direction detection module 320 in use are shown within FIGS. 4a, 4b, and 4c.

In one embodiment, the storage module 330 stores a plurality of profiles wherein each profile is associated with various content and other data associated with the content. In one embodiment, the profile stores exemplary information as shown in a profile in FIG. 6. In one embodiment, the storage module 330 is located within the server device 130. In another embodiment, portions of the storage module 330 are located within the electronic device 110.

In one embodiment, the interface module 340 detects the electronic device 110 as the electronic device 110 is connected to the network 120.

In another embodiment, the interface module 340 detects input from the interface device 115 such as a keyboard, a mouse, a microphone, a still camera, a video camera, and the like.

In yet another embodiment, the interface module 340 provides output to the interface device 115 such as a display, speakers, external storage devices, an external network, and the like.

In one embodiment, the profile module 360 processes profile information related to the specific content. In one embodiment, exemplary profile information is shown within a record illustrated in FIG. 6.

In one embodiment, the variation detection module 370 detects variation between adjacent pixels. In one embodiment, the variation among the pixels includes various parameters such as color, illumination intensity, and the like.

In one embodiment, the area in which pixels are detected is specified by the frame/field detection module 310. For example, the area specified by the frame/field detection module 310 may be the entire frame or field in one embodiment. In another embodiment, the area specified by the frame/field detection module 310 may be a portion of the entire frame or field.

In one embodiment, the variation detection module 370 is utilized to identify variation among pixels adjacent to each other. For example, the adjacent pixels that are detected by the variation detection module 370 may be identified as either similar or dissimilar based on the parameters. Further, a threshold level may be utilized to determine similarities or dissimilarities in one embodiment.

In one embodiment, the local variation is determined by computing local orientation on multiple scales amongst neighboring pixels by varying the scale of the neighborhood considered. Computing orientation on a broad neighborhood of pixels produces a low variance reference orientation. Computing orientation on a narrow neighborhood of pixels produces a fine grained high variance local orientation. Local variance is then determined by the similarity or dissimilarity of the broad and narrow scale orientations, based on threshold parameters.

In one embodiment, neighboring broad and narrow scale orientations are combined using fuzzy logic to determine the degree of variance amongst adjacent pixels.

Examples of the variation detection module 370 in use are shown within FIGS. 4*a*, 4*b*, and 4*c*.

In one embodiment, the upscale module 380 directs increasing the original resolution of an original frame to the new resolution of the new frame. In one embodiment, the original resolution is 480p and the new resolution is 1080p. In other embodiments, any number of resolutions may be represented by the original resolution and the new resolution. In one embodiment, the upscale module 380 maps the original pixels within the original frame into the new frame. After mapping the original pixels into the new frame, there will be missing pixel data within the new frame.

In one embodiment, the upscale module 380 utilizes both the direction detection module 320 and the variation detection module 370 to determine the missing pixel data within the new frame. In one embodiment, the direction detection module 320 detects related pixels over a broad area and detects trends that span over multiple pixels from the original frame. Further, the variation detection module 370 compares adjacent pixels to each other to determine either they are similar or dissimilar within the original frame. Based on both a broader context through the direction detection module 320 and a narrower comparison through the variation detection module 370, the upscale module 380 is capable of providing the missing pixel data within the new frame.

In one embodiment, the de-interlace module 390 directs transforming an interlaced field into a frame. In one embodiment, the de-interlace module 390 maps the original pixels within the original field into the new frame. After mapping the original pixels into the new frame, there will be rows of missing pixel data within the new frame.

In one embodiment, the de-interlace module 390 utilizes both the direction detection module 320 and the variation detection module 370 to determine the missing pixel data within the new frame. In one embodiment, the direction detection module 320 detects related pixels over a broad area and detects trends that span over multiple pixels within the original field. Further, the variation detection module 370 compares adjacent pixels to each other to determine either they are similar or dissimilar from the original field. Based on both a broader context through the direction detection module 320 and a narrower comparison through the variation detection module 370, the de-interlace module 390 is capable of providing the missing pixel data for the rows within the new frame.

The system 300 in FIG. 3 is shown for exemplary purposes and is merely one embodiment of the methods and apparatuses for upscaling video. Additional modules may be added to the system 600 without departing from the scope of the methods and apparatuses for upscaling video. Similarly, modules may be combined or deleted without departing from the scope of the methods and apparatuses for upscaling video.

FIGS. 4*a*, 4*b*, 4*c*, 5*a*, 5*b*, and 5*c* represent exemplary frames. For the sake of simplicity, the pixels represented within these frames have only two states either active or inactive. Further, the exemplary frames may represent the entire frame or a portion of the entire frame.

In FIG. 4*a*, a frame 400 represents a 5×5 frame. The frame 400 includes active pixels 401, 402, 403, and 404 at positions (2, 3), (3, 3), (4, 2), and (5, 2), respectively. The pixels in the remaining positions within the frame 400 are inactive. In one embodiment, the frame/field detection module 310 detects the frame 400. In one embodiment, the frame/field detection module 310 determines the size of the frame 400 and may increase or decrease the size of the frame 400.

In one embodiment, the direction detection module 320 detects overall direction and movement between related pixels within the frame 400. In one embodiment, the direction detection module 320 groups active pixels as related pixels. These related pixels may be located anywhere within the frame 400.

In FIG. 4*b*, a frame 410 represents a 5×5 frame. The frame 410 includes active pixels 411, 412, 413, and 414 at positions (2, 3), (3, 3), (4, 2), and (5, 2), respectively. The active pixels 411, 412, 413, and 414 correspond with the pixels 401, 402, 403, and 404 which are shown in FIG. 4*a*. In one embodiment, the frame 410 is a representation of the frame 400 and illustrates the active pixels 411, 412, 413, and 414 as vectors.

In one embodiment, the variation detection module 370 detects variation between the adjacent pixels within the frame 410. In another embodiment, the variation detection module 370 detects variation between the adjacent pixels within the frame 400. In this example, the pixels are either active or inactive.

For example in one instance, the variation detection module 370 detects a difference between the pixel 411 and an adjacent pixel located at (1, 3). Because the pixel 411 is active and the adjacent pixel located at (1, 3) is inactive, the difference detected by the variation detection module 370 is above a threshold and indicates that these 2 pixels are considered sufficiently distinct.

In another instance, the variation detection module 370 detects a difference between the pixel 411 and the adjacent pixel 412. Because the pixels 411 and 412 are active, the difference detected by the variation detection module 370 is below a threshold and indicates that these 2 pixels are considered sufficiently similar.

In FIG. 4*c*, a frame 420 represents a 10×10 frame. The frame 420 includes active pixels 421, 422, 423, and 424 at positions (3, 6), (5, 6), (8, 4), and (10, 4), respectively. The active pixels 421, 422, 423, and 424 correspond with the pixels 411, 412, 413, and 414 which are shown in FIG. 4*b*. Further, the active pixels 421, 422, 423, and 424 are shown within the frame 420 in the approximate locations with respect to the pixels 411, 412, 413, and 414 within the frame 410.

In one embodiment, the direction detection module 320 detects the direction of the group of related pixels 401, 402, 403, and 404 or pixels 411, 412, 413, and 414. Further, the variation detection module 370 also detects the variation between adjacent pixels within the frame 400 or the frame 410.

Based on the direction detection module 320 and the variation detection module 370, additional active pixels 425 in positions (3-10, 5), (4, 6), and (9, 4) are inserted within the frame 420, in one embodiment. In this example, additional active pixels were not inserted at positions (2, 5) and (2, 6) because the movement of related pixels 401, 402, 403, and 404 or pixels 411, 412, 413, and 414 runs approximately along the x-axis (as detected by the direction detection module 320) and terminates at the pixels 401 and 411 (as detected by the variation detection module 370). Further, the additional active pixels at (4, 6), (6-7, 5), and (9, 4) were inserted because the occur between even with the related pixels 401, 402, 403, and 404 or pixels 411, 412, 413, and 414. In this instance, the additional active pixels at (3-5, 5) and (8-10, 5) are also inserted because they are perpendicular to the movement detected in the related pixels 401, 402, 403, and 404 or pixels 411, 412, 413, and 414.

Different pixels may be inserted within the frame 420 in other embodiment without departing from the spirit of the invention.

Figure 5:
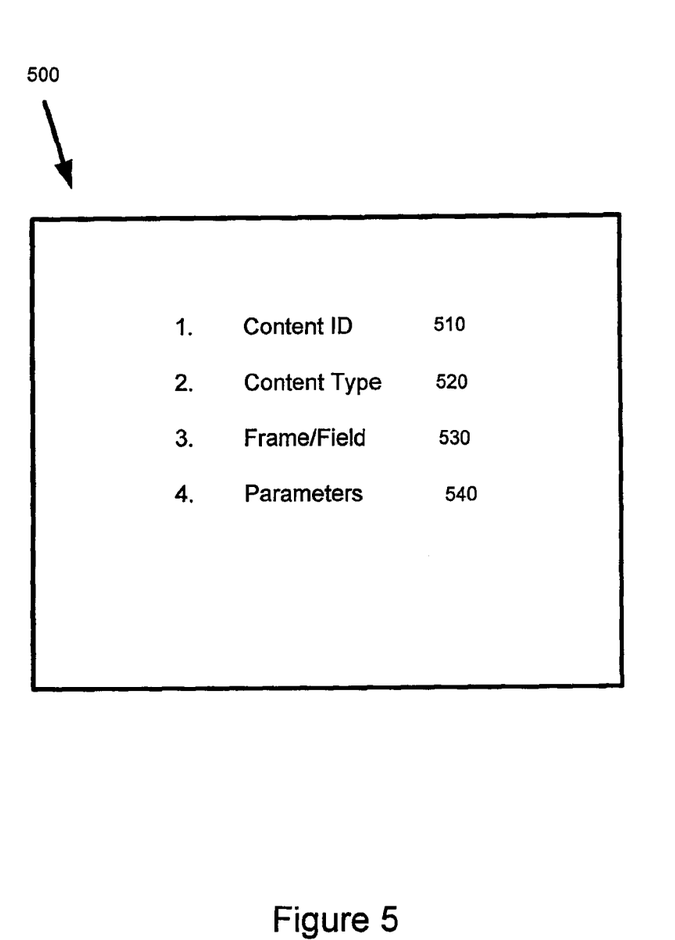
FIG. 5 illustrates an exemplary record consistent with one embodiment of the methods and apparatuses for upscaling video.

FIG. 5 illustrates a simplified record 500 that corresponds to a profile that describes content. In one embodiment, the record 500 is stored within the storage module 330 and utilized within the system 300. In one embodiment, the record 500 includes a content identification field 510, a content type field 520, a frame/field identification field 530, and a parameters field 540.

In one embodiment, the content identification field 510 provides a customizable label for particular content. For example, the content identification field 510 may be labeled with arbitrary names such as "Home Video", "Emily's Birthday Party", and the like.

In one embodiment, the content type field 520 identifies the type of content associated with the identified content in the field 510. For example, content types include 480p, 1080i, and the like.

In one embodiment, the frame/field identification field 530 identifies a particular frame/field of the identified content. In another embodiment, the frame/field identification field 530 indicates a range of frames/fields within the identified content.

In one embodiment, the parameter field 540 includes the parameters that describe the specified frame(s)/field(s). In one embodiment, the parameters include information generated by the direction detection module 320, the variation detection module 370, the upscale module 380, and/or the de-interlace module 390. Further, the parameters may include specific locations within the frame/field that the direction detection module 320 detects groups of related pixels.

Figure 6:
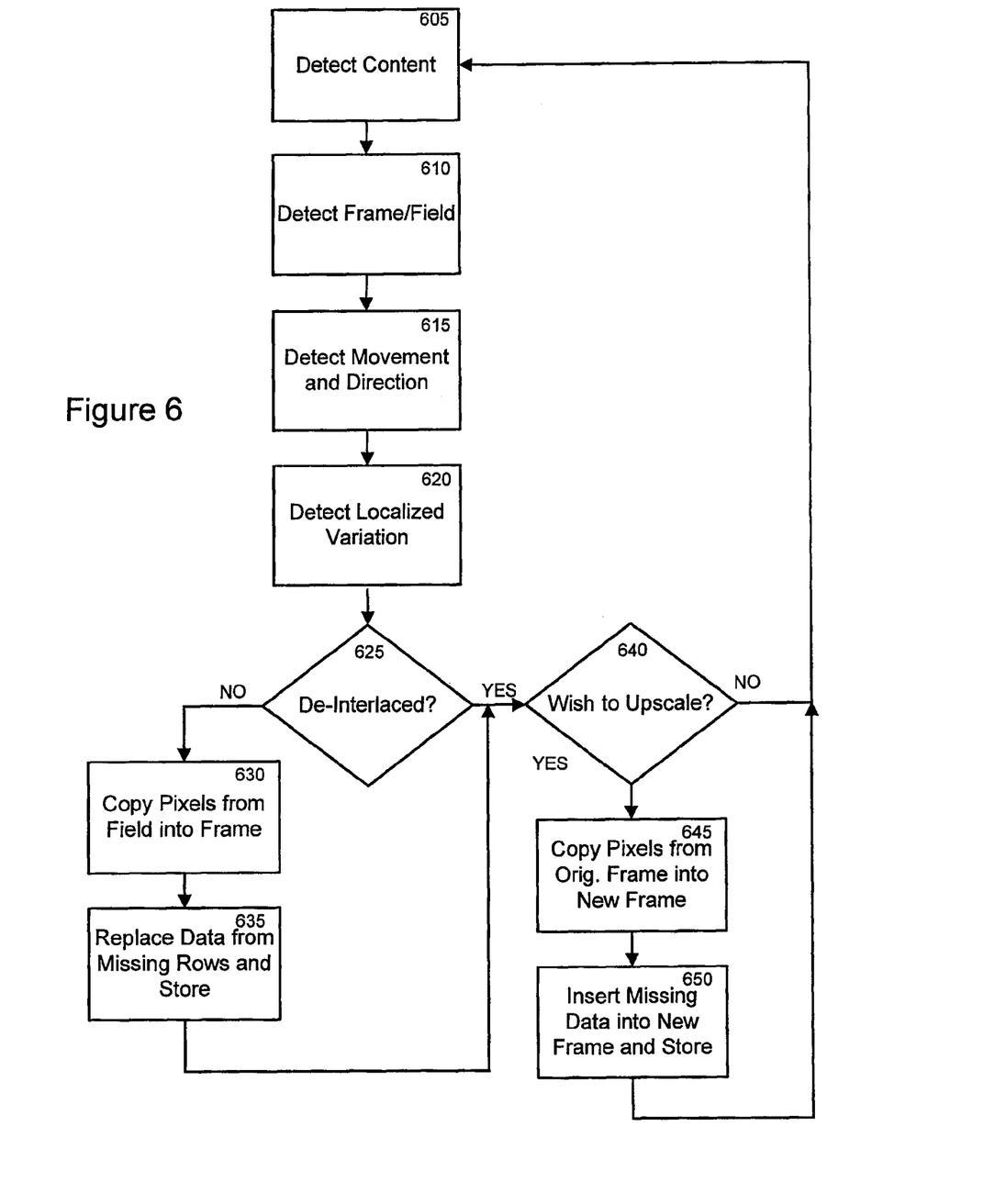
FIG. 6 is a flow diagram consistent with one embodiment of the methods and apparatuses for upscaling video.
Figure 7:
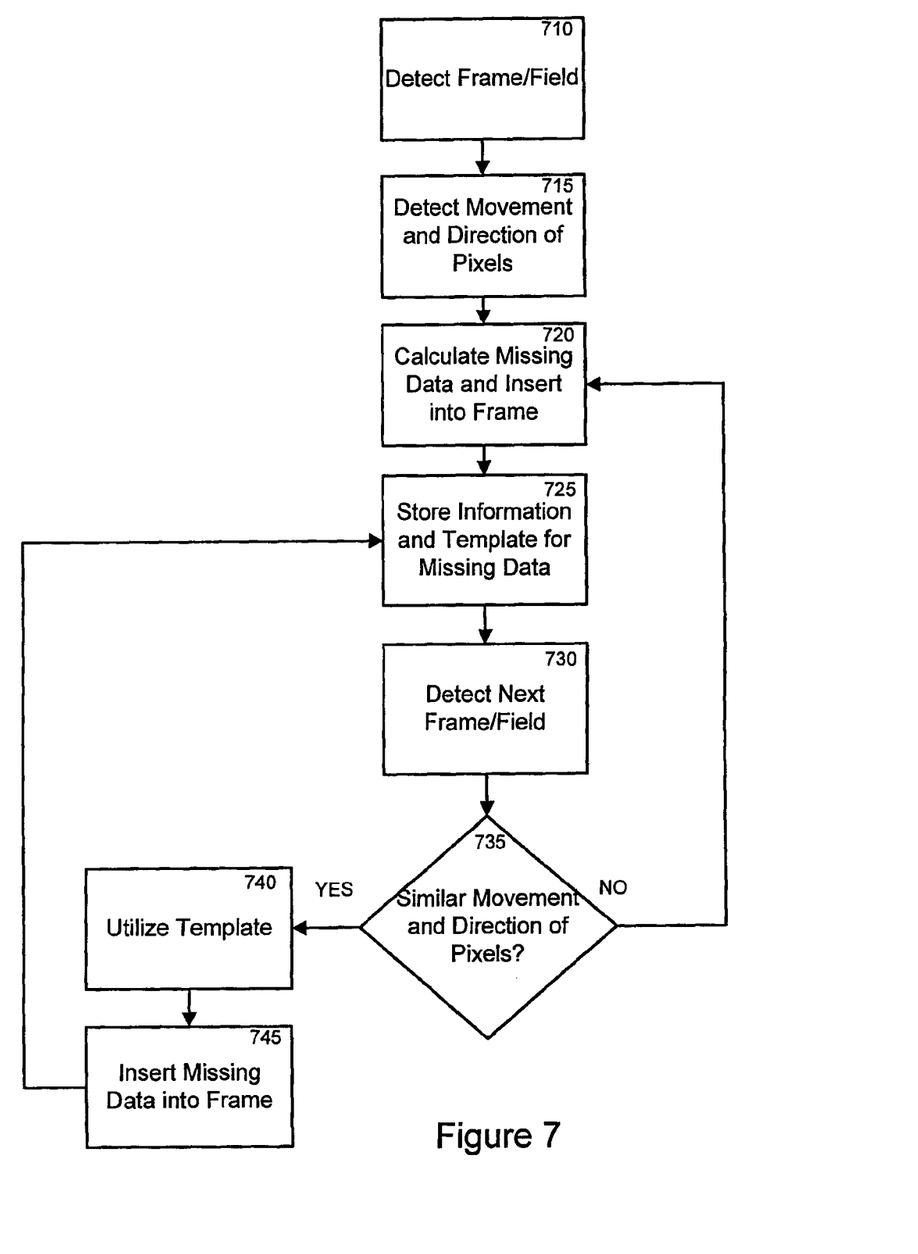
FIG. 7 is a flow diagram consistent with one embodiment of the methods and apparatuses for upscaling video.
Figure 8:
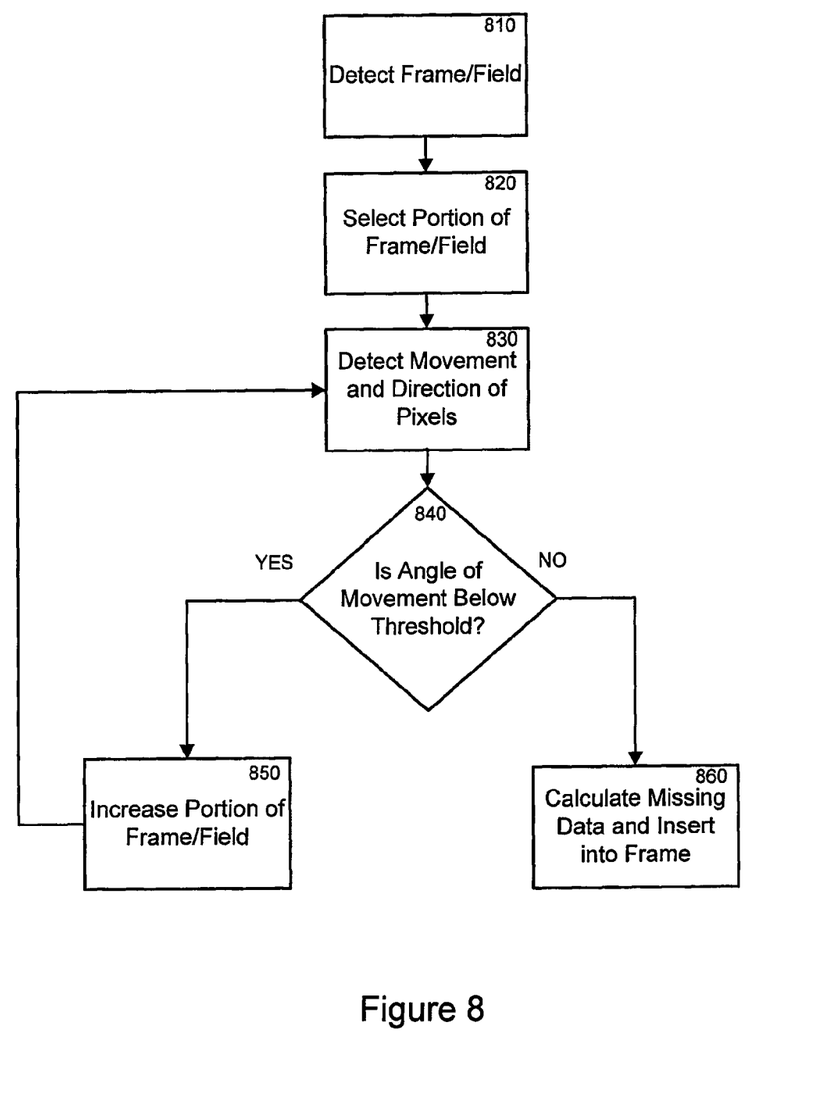
FIG. 8 is a flow diagram consistent with one embodiment of the methods and apparatuses for upscaling video.

The flow diagrams as depicted in FIGS. 6, 7, and 8 are one embodiment of the methods and apparatuses for upscaling video. The blocks within the flow diagrams can be performed in a different sequence without departing from the spirit of the methods and apparatuses for upscaling video. Further, blocks can be deleted, added, or combined without departing from the spirit of the methods and apparatuses for upscaling video.

The flow diagram in FIG. 6 illustrates selectively de-interlacing content and upscaling content according to one embodiment of the invention.

In Block 605, content is detected. In one embodiment, the content is detected by the system 300.

In Block 610, a frame or field is detected. In one embodiment, if the content includes interlaced video, then a field will be detected. If the content includes de-interlaced video, a frame will be detected. In another embodiment, a portion of the frame or field is detected. In one instance, the frame/field detector module 310 detects the frame or field.

In Block 615, movement and direction is detected. In one embodiment, the movement and direction of the pixels within the frame or field from the Block 610 is detected by the direction detection module 320. For example, similar pixels are identified and a movement and direction of this similar group of pixels are identified. In one embodiment, the pixels may be similar in texture, color, luminosity, and the like.

In Block 620, localized variation is detected among the pixels within the frame or field from the Block 610. In one embodiment, the variation is detected between adjacent pixels. In addition, the variation may be detected through the variation detection module 370.

In Block 625, the content detected within the Block 605 is determined to be interlaced or de-interlaced. If the detected content is interlaced, then the pixels are copied from the field into a new frame in Block 630.

In Block 635, the missing pixel data from the alternate rows are replaced with new pixel data. In one embodiment, the new pixel data is generated based on the detected movement and direction from the Block 615 and the detected localized variation from the Block 620.

In one embodiment, the new pixel data, the detected movement and direction, and the detected localized variation are stored within a profile.

In one embodiment, the functions described within the Block 630 and 635 may be coordinated by the de-interlace module 390.

In the Block 625, if the content is already de-interlaced, then proceed to Block 640. Similarly, after the Block 635, proceed to the Block 640.

In the Block 640, if upscaling the original frame is desired, then proceed to Block 645. If upscale the original frame is not desired, then return to detecting content within the Block 605.

In Block 645, the original pixels are copied from the original frame into a new frame in Block 645. In one embodiment, the new frame is larger than the original frame. In one instance, when the original pixels are copied into the new frame, the original pixels are positioned in the new frame in a similar proportion as found within the original frame. For example, the frame 400 can be considered the original frame and the frame 420 can be considered the new frame. Further in this example, the active pixels 401, 402, 403, and 404 within the frame 400 (FIG. 4*a*) are located at the approximate locations of the active pixels 421, 422, 423, and 424 within the frame 420 (FIG. 4*c*). Although not explicitly shown, the inactive pixels from the frame 400 can be copied as well and inserted within the frame 420 in one embodiment.

In Block 650, the missing pixel data within the new frame is replaced with new pixel data. In one embodiment, the new pixel data is generated based on the detected movement and direction from the Block 615 and the detected localized variation from the Block 620.

In one embodiment, the new pixel data, the detected movement and direction, and the detected localized variation are stored within a profile.

In one embodiment, the functions described within the Block 645 and 650 may be coordinated by the upscale module 380.

The flow diagram in FIG. 7 illustrates storing information related to detecting movement of pixels according to one embodiment of the invention.

In Block 710, a frame or field is detected. In one embodiment, if the content includes interlaced video, then a field will be detected. If the content includes de-interlaced video, a frame will be detected. In another embodiment, a portion of the frame or field is detected. In one instance, the frame/field detector module 310 detects the frame or field.

In Block 715, movement and direction is detected. In one embodiment, the movement and direction of the pixels within the frame or field from the Block 710 is detected by the direction detection module 320. For example, similar pixels are identified and a movement and direction of this similar group of pixels are identified. In one embodiment, the pixels may be similar in texture, color, luminosity, and the like.

In Block 720, the original pixels are copied from the original frame/field into a new frame. In one embodiment, the new frame is larger than the original frame/field. In one instance, when the original pixels are copied into the new frame, the original pixels are positioned in the new frame in a similar proportion as found within the original frame/field. For example, the frame 400 can be considered the original frame and the frame 420 can be considered the new frame. Further in this example, the active pixels 401, 402, 403, and 404 within the frame 400 (FIG. 4*a*) are located at the approximate locations of the active pixels 421, 422, 423, and 424 within the frame 420 (FIG. 4*c*). Although not explicitly shown, the inactive pixels from the frame 400 can be copied as well and inserted within the frame 420 in one embodiment.

In Block 720, the missing pixel data within the new frame is replaced with new pixel data. In one embodiment, the new pixel data is generated based on the detected movement and direction from the Block 715. In another embodiment, the new pixel data is generated based on the detected localized variation from the Block 620.

In Block 725, the new pixel data, the detected movement and direction, and the detected localized variation are stored within a profile. In one embodiment, a template is created to store this profile information describing a particular field or frame. In one embodiment, this template is stored within the storage module 330.

In Block 730, the next frame or field is detected.

In Block 735, if the frame or field detected within the Block 730 matches the movement described by a template created within the Block 725, then a template is identified within Block 740. If the frame or field detected within the Block 730 does not have a movement that matches an existing template, then the missing pixel data is calculated in the Block 720.

In Block 745, the missing pixel data within the new frame is replaced with new pixel data. In one embodiment, the new pixel data is provided based on the template that is identified within the Block 835.

The flow diagram in FIG. 8 illustrates adjusting an area of a current frame or field according to one embodiment of the invention.

In Block 810, a frame or field is detected. In one embodiment, if the content includes interlaced video, then a field will be detected. If the content includes de-interlaced video, a frame will be detected. In another embodiment, a portion of the frame or field is detected. In one instance, the frame/field detector module 310 detects the frame or field.

In Block 820, a portion of the frame or field is selected. In one embodiment, a large portion of the frame or field is selected. In another embodiment, a small portion of the frame or field is selected.

In Block 830, movement and direction is detected. In one embodiment, the movement and direction of the pixels within the selected portion of the frame or field from the Block 820 is detected by the direction detection module 320. For example, similar pixels are identified and a movement and direction of this similar group of pixels are identified. In one embodiment, the pixels may be similar in texture, color, luminosity, and the like.

In Block 830, the original pixels are copied from the original frame/field into a new frame. In one embodiment, the new frame is larger than the original frame/field. In one instance, when the original pixels are copied into the new frame, the original pixels are positioned in the new frame in a similar proportion as found within the original frame/field. For example, the frame 400 can be considered the original frame and the frame 420 can be considered the new frame. Further in this example, the active pixels 401, 402, 403, and 404 within the frame 400 (FIG. 4*a*) are located at the approximate locations of the active pixels 421, 422, 423, and 424 within the frame 420 (FIG. 4*c*). Although not explicitly shown, the inactive pixels from the frame 400 can be copied as well and inserted within the frame 420 in one embodiment.

In Block 840, the angle of the detected movement and direction of the related pixels from the Block 830 are analyzed. In one embodiment, the movement and direction of the related pixels form an angle with a baseline. In one instance, the baseline is parallel with the x-axis. In another instance, the baseline is parallel with the y-axis.

In one embodiment, shallow angles between the baseline and the movement and direction of the related pixels typically allow the system 300 to provide more accurate data for the missing pixels when the selected portion of the frame or field encompasses a larger area.

If the angle formed by the baseline and the movement and direction of the related pixels is below a threshold, then the portion of the frame or field initially selected within the Block 820 is increased. In one embodiment, the portion of the frame or field is increased by an amount based on the specific threshold. For example, if the threshold represents a very small angle, then the portion selected from the frame or field substantially increases.

If the angle formed by the baseline and the movement and direction of the related pixels is below a threshold, then the portion of the frame or field is increased in Block 950.

If the angle formed by the baseline and the movement and direction of the related pixels is below a threshold, then the missing pixel data within the new frame is replaced with new pixel data in Block 860. In one embodiment, the new pixel data is generated based on the detected movement and direction from the Block 830.

The foregoing descriptions of specific embodiments of the invention have been presented for purposes of illustration and description. For example, the invention is described within the context of dynamically detecting and generating image information as merely one embodiment of the invention. The invention may be applied to a variety of other applications.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed:

1. A method comprising:
    detecting content that represents original image information;
    detecting a direction of the content wherein the direction corresponds to a portion of the original image information;
    computing local orientation on a plurality of scales amongst neighboring pixels that are represented by the original image information by varying a scale of each neighborhood being considered, wherein local orientation is computed by summing two dimensional covariance matrices of image attributes in neighboring pixels, and wherein the image attributes comprise at least one of pixel color and illumination intensity;
    combining the plurality of scales of computed local orientations to determine a degree of variation amongst adjacent pixels, wherein the variation is determined by a similarity or dissimilarity of the plurality of scales of computed local orientations; and
    generating new image information based on the direction of the content and the variation amongst the adjacent pixels.

2. The method according to claim 1 wherein the original image information corresponds with an interlaced field.

3. The method according to claim 1 wherein the original image information corresponds with a de-interlaced frame.

4. The method according to claim 1 further comprising integrating the new image information with the original image information in a frame.

5. The method according to claim 1 further comprising storing the new image information within a storage device.

6. The method according to claim 1 wherein the new image information is representative of at least one pixel.

7. The method according to claim 1 wherein the original image information is representative of at least one pixel.

8. The method according to claim 1 further comprising upscaling the content with the new image information.

9. The method according to claim 8 wherein upscaling further comprises copying the original image information from an original frame into a new frame wherein the new frame is larger than the original frame.

10. The method according to claim 8 wherein upscaling further comprises copying the new image information into a new frame.

11. The method according to claim 1 further comprising de-interlacing the content with the new image information.

12. The method according to claim 11 wherein de-interlacing further comprises copying the original image information from an original field into a new frame wherein the new frame has approximately twice as many rows as the original field.

13. The method according to claim 11 wherein de-interlacing further comprises copying the new image information into a new frame.

14. The method according to claim 1 wherein detecting the direction further comprises detecting related pixels from the original image information.

15. The method according to claim 14 wherein the related pixels are identified through one or more of luminosity, color, texture, and state.

16. The method according to claim 1 further comprising storing information related to the direction of the content and the new image information within a template.

17. The method according to claim 16 further comprising matching subsequent image information with the direction of the original image information within the template.

18. The method according to claim 17 further comprising identifying the new image information within the template based on matching the subsequent image information with the template.

19. A system, comprising:
    a content detection module configured for detecting content that represents a portion of an original image;
    a direction detection module configured for detecting a direction of related pixels that comprise the content;
    a variation detection module configured for computing local orientation on a plurality of scales amongst neighboring pixels that comprise the content by varying a scale of each neighborhood being considered, wherein local orientation is computed by summing two dimensional covariance matrices of image attributes in neighboring pixels, and wherein the image attributes comprise at least one of pixel color and illumination intensity, wherein the variation detection module is further configured for combining the plurality of scales of computed local orientations to determine a degree of variation amongst adjacent pixels, wherein the variation is determined by a similarity or dissimilarity of the plurality of scales of computed local orientations; and
    an interface module configured for generating new image information for at least a portion of a frame based on the direction and the variation.

20. The system according to claim 19 wherein the original image is a frame.

21. The system according to claim 19 wherein the original image is a field.

22. The system according to claim 19 further comprising a profile module configured for organizing the content and corresponding direction and variation.

23. The system according to claim 19 further comprising a storage module configured for storing the content and corresponding direction and variation.

24. The system according to claim 19 further comprising an upscale module configured for directing upscaling the original image based on the direction and the variation.

25. The system of claim 19 further comprising a de-interlace module configured for directing de-interlacing the original image based on the direction and the variation.

26. A non-transitory computer-readable medium having computer executable instructions for performing a method comprising:
    detecting content that represents original image information;
    detecting a direction of the content wherein the direction corresponds to a portion of the original image information;
    computing local orientation on a plurality of scales amongst neighboring pixels that are represented by the original image information by varying a scale of each neighborhood being considered, wherein local orientation is computed by summing two dimensional covariance matrices of image attributes in neighboring pixels, and wherein the image attributes comprise at least one of pixel color and illumination intensity;
    combining the plurality of scales of computed local orientations to determine a degree of variation amongst adjacent pixels, wherein the variation is determined by a similarity or dissimilarity of the plurality of scales of computed local orientations; and generating new image information based on the direction of the content and the variation amongst the adjacent pixels.

27. A method comprising:

selecting content that represents at least a portion of an original image, wherein the original image is to be upscaled and missing pixel data is to be calculated for use in the upscaling;

detecting a direction of the content based on related pixels within the content;

detecting an angle of the direction relative to an axis;

comparing the angle with a threshold;

if the angle is below the threshold, increasing the portion of the original image of the content and repeating the detecting a direction step; and if the angle is not below the threshold, calculating the missing pixel data based on the detected direction.

28. The method according to claim 27 wherein the axis represents an x-axis.

29. The method according to claim 27 wherein the axis represents a y-axis.

30. The method according to claim 27 wherein detecting the direction further comprises detecting related pixels from the original image.

31. The method according to claim 30 wherein the related pixels are identified through one of luminosity, color, texture, and state.

\* \* \* \* \*